US008983043B2

(12) United States Patent
Mairs et al.

(10) Patent No.: US 8,983,043 B2
(45) Date of Patent: *Mar. 17, 2015

(54) DATA COMMUNICATION

(71) Applicant: Metaswitch Networks Ltd, Enfield (GB)

(72) Inventors: Chris Mairs, Enfield (GB); Philip Pearl, Enfield (GA); Felix Palmer, Enfield (GB); David Drysdale, London (GB); Shaun Crampton, Enfield (GB)

(73) Assignee: Metaswitch Networks Ltd, Enfeild (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/865,300

(22) Filed: Apr. 18, 2013

(65) Prior Publication Data

US 2013/0230158 A1    Sep. 5, 2013

Related U.S. Application Data

(63) Continuation of application No. PCT/GB2011/001490, filed on Oct. 18, 2011.

(60) Provisional application No. 61/394,332, filed on Oct. 18, 2010.

(30) Foreign Application Priority Data

Mar. 18, 2011 (GB) .................................. 1104558.0

(51) Int. Cl.
*H04M 11/00* (2006.01)
*H04L 29/06* (2006.01)
*H04M 7/00* (2006.01)

(52) U.S. Cl.
CPC ......... *H04L 65/4007* (2013.01); *H04M 7/0036* (2013.01); *H04M 7/0057* (2013.01); *H04L 65/4023* (2013.01)
USPC ...................................... 379/93.01; 709/231

(58) Field of Classification Search
None
See application file for complete search history.

(56) References Cited

U.S. PATENT DOCUMENTS 5,802,282 A    9/1998   Hales et al.
6,112,084 A    8/2000   Sicher et al.
(Continued)

FOREIGN PATENT DOCUMENTS

EP    0999712 A2    5/2000
EP    1069789 A1    1/2001
(Continued)

OTHER PUBLICATIONS

International Search Report issued in corresponding application No. PCT/GB2011/001490 on Feb. 17, 2012.
(Continued)

*Primary Examiner* — Maria El-Zoobi
(74) *Attorney, Agent, or Firm* — EIP US LLP

(57) ABSTRACT

A method of establishing a communications session for data with respect to at least two user devices in a packet switched communications network in parallel to a voice session via a circuit switched network. Call party details of a telephony call are received. The telephony call involves at least a first telephony user device and a second telephony user device. The call party details include a first identity associated with the first telephony user device and a second identity associated with the second telephony user device. A separate communications session is established on the basis of the first and second identities received in the call party details and depending on the capabilities of the user devices. The communications session is separate from the telephone call, for the communication of data to and/or from at least two user devices.

12 Claims, 11 Drawing Sheets

(56) References Cited

U.S. PATENT DOCUMENTS

| | | |
|---|---|---|
| 6,295,551 B1 | 9/2001 | Roberts et al. |
| 6,317,609 B1 | 11/2001 | Alperovich et al. |
| 6,351,639 B1 | 2/2002 | Motohashi |
| 6,516,203 B1 | 2/2003 | Enzmann et al. |
| 6,658,100 B1 | 12/2003 | Lund |
| 6,704,294 B1 | 3/2004 | Cruickshank |
| 6,888,936 B1 | 5/2005 | Groen et al. |
| 7,039,170 B1 | 5/2006 | Sylvain |
| 7,496,978 B1 | 3/2009 | Begeja et al. |
| 7,996,552 B2 * | 8/2011 | Philyaw et al. ............... 709/231 |
| 2002/0019812 A1 | 2/2002 | Board et al. |
| 2002/0057678 A1 | 5/2002 | Jiang et al. |
| 2002/0181446 A1 | 12/2002 | Preston et al. |
| 2003/0078053 A1 | 4/2003 | Abtin et al. |
| 2004/0114747 A1 * | 6/2004 | Trandal et al. ........... 379/211.02 |
| 2004/0152457 A1 * | 8/2004 | Goldstein et al. ............. 455/419 |
| 2004/0190695 A1 | 9/2004 | Parker |
| 2004/0213207 A1 | 10/2004 | Silver et al. |
| 2005/0165719 A1 | 7/2005 | Greenspan et al. |
| 2005/0249146 A1 | 11/2005 | Pinault et al. |
| 2006/0026277 A1 | 2/2006 | Sutcliffe |
| 2007/0010264 A1 | 1/2007 | Sun et al. |
| 2007/0242809 A1 | 10/2007 | Mousseau et al. |
| 2007/0244811 A1 | 10/2007 | Tumminaro |
| 2008/0043965 A1 | 2/2008 | Cellini et al. |
| 2008/0081627 A1 | 4/2008 | Shan et al. |
| 2008/0117897 A1 | 5/2008 | Criddle et al. |
| 2008/0146256 A1 | 6/2008 | Hawkins et al. |
| 2008/0317000 A1 | 12/2008 | Jackson |
| 2009/0164645 A1 | 6/2009 | Sylvain |
| 2009/0215425 A1 | 8/2009 | Ebersberger |
| 2010/0007712 A1 | 1/2010 | Jang |
| 2010/0056119 A1 | 3/2010 | Shaffer et al. |
| 2010/0235894 A1 * | 9/2010 | Allen et al. ....................... 726/7 |
| 2010/0250754 A1 | 9/2010 | Birch et al. |
| 2011/0225238 A1 | 9/2011 | Shaffer et al. |
| 2013/0230157 A1 | 9/2013 | Mairs et al. |
| 2013/0252595 A1 | 9/2013 | Mairs et al. |
| 2013/0278385 A1 | 10/2013 | Baskin et al. |
| 2014/0013371 A1 * | 1/2014 | Brown et al. ................. 725/110 |

FOREIGN PATENT DOCUMENTS

| | | |
|---|---|---|
| EP | 1296499 A2 | 3/2003 |
| EP | 1441555 A1 | 7/2004 |
| EP | 2081369 A1 | 7/2009 |
| GB | 2362291 B | 1/2004 |
| JP | 11017782 A | 1/1999 |
| WO | 98/59256 A2 | 12/1998 |
| WO | 99/49677 A1 | 9/1999 |
| WO | 02/15519 A2 | 2/2002 |
| WO | 03/034692 A2 | 4/2003 |
| WO | 2004/059995 A1 | 7/2004 |
| WO | 2005/064958 A1 | 7/2005 |
| WO | 2006/010373 A1 | 2/2006 |
| WO | 2007/004933 A1 | 1/2007 |
| WO | 2007/062077 A2 | 5/2007 |
| WO | 2007/092908 A2 | 8/2007 |
| WO | 2008/065662 A2 | 6/2008 |
| WO | 2009/009167 A1 | 1/2009 |
| WO | 2009/061332 A1 | 5/2009 |
| WO | 2011/069559 A1 | 6/2011 |

OTHER PUBLICATIONS

Search Report issued in corresponding application No. GB1104558.0 on Jul. 19, 2011.

International Search Report and Written Opinion issued in corresponding application No. PCT/GB2011/001492 on Jan. 23, 2012.

International Search Report and Written Opinion issued in corresponding application No. PCT/GB2011/052477 on May 21, 2012.

International Search Report and Written Opinion issued in corresponding application No. PCT/GB2011/050332 on Jun. 5, 2012.

* cited by examiner

DATA COMMUNICATION

CROSS REFERENCE TO PRIOR APPLICATIONS

This application is a continuation of International Application No. PCT/GB2011/001490, filed 18 Oct. 2011 and designating the US, which claims priority to: U.S. provisional patent application No. 61/394,332 filed on 18 Oct. 2010; and GB patent application no. 1104558.0 filed on 18 Mar. 2011, all of which are incorporated herein by reference in their entirety.

TECHNICAL FIELD

The present invention relates to the communication of data. In particular, but not exclusively, the present invention relates to the communication of data between user devices during telephone calls.

BACKGROUND

Communication between parties in a telecommunications network can be carried out in a number of ways. Most commonly, communication is carried out by a calling party dialling the telephone dialling number of a called party telephony device on a calling party telephony device. The dialling of the telephone number causes a call set-up process to be carried out in the network which results in the telephone of the called party ringing. If the called party chooses to answer their telephone, a telephone call can ensue between the calling party and the called party. The telephone call allows audio data such as speech data to be transferred along an audio channel created between the calling party telephony device and the called party telephony device.

Some telephony devices have enhanced capabilities which allow transfer of video data along a video channel created between the calling party telephone and the called party telephone. A video call may not be possible unless both the calling and called party telephone devices support video call functionality.

Audio or video conferencing may be carried out between three or more remote telephony devices, allowing communication of audio and/or video data between parties to the conference.

Web conferencing is also possible between multiple remote parties using devices with combined data processing, display and telephony capabilities. Web conferencing allows online meetings to be conducted for viewing and/or collaborating on common multimedia content.

Parties may also exchange text data by use of text messaging services such as the Short Message Service (SMS). Enhanced messaging services such as the Multimedia Messaging Service (MMS) allow parties to exchange image and video data in addition to text data.

The exemplary methods of communication described above provide a wide range of options for remote parties to communicate with each other. However, each method typically has different requirements in terms of device and/or network capability and interchanging between the different methods is either not possible or requires use of inconvenient set-up or configuration processes.

It would therefore be desirable to provide improved methods for communicating data between remote parties, including communication of data in a manner convenient to the parties.

SUMMARY

According to a first aspect of the invention, there is provided a method of establishing a communications session for communication of data with respect to at least two user devices in a data communications network, the method comprising:

receiving call party details of a telephone call, the telephone call involving at least a first telephony user device and a second telephony user device, said call party details including a first identity associated with said first telephony user device and a second identity associated with said second telephony user device;

establishing, on the basis of said first and second identities received in said call party details, a separate communications session, separate from said telephone call, for the communication of data to and/or from said at least two user devices;

receiving, from one of said at least two user devices, an identifier identifying a software component to be used in said separate communications session; and enabling the download of said software component to another of said at least two user devices, in response to the receipt of said software component identifier.

According to a second aspect of the invention, there is provided a server system arranged to perform a method of establishing a communications session for communication of data with respect to at least two user devices in a data communications network, the method comprising:

receiving call party details of a telephone call, the telephone call involving at least a first telephony user device and a second telephony user device, said call party details including a first identity associated with said first telephony user device and a second identity associated with said second telephony user device;

establishing, on the basis of said first and second identities received in said call party details, a separate communications session, separate from said telephone call, for the communication of data to and/or from said at least two user devices;

receiving, from one of said at least two user devices, an identifier identifying a software component to be used in said separate communications session; and enabling the download of said software component to another of said at least two user devices, in response to the receipt of said software component identifier.

According to a third aspect of the invention, there is provided a computer program product comprising a non-transitory computer-readable storage medium having computer readable instructions stored thereon, the computer readable instructions being executable by a computerized device to cause the computerized device to perform a method of establishing a communications session for communication of data with respect to at least two user devices in a data communications network, the method comprising:

receiving call party details of a telephone call, the telephone call involving at least a first telephony user device and a second telephony user device, said call party details including a first identity associated with said first telephony user device and a second identity associated with said second telephony user device;

establishing, on the basis of said first and second identities received in said call party details, a separate communications session, separate from said telephone call, for the communication of data to and/or from said at least two user devices;

receiving, from one of said at least two user devices, an identifier identifying a software component to be used in said separate communications session; and enabling the download of said software component to another of said at least two user devices, in response to the receipt of said software component identifier.

According to a fourth aspect of the invention, there is provided a telephony user device capable of establishing a communications session for communication of data with respect to at least one other user device in a data communications network, the telephony user device being arranged to:

transmit call party details of a telephone call, the telephone call involving at least said telephony user device, said telephony user device being a first telephony user device, and a second telephony user device, said call party details including a first identity associated with said first telephony user device and a second identity associated with said second telephony user device, at least one of said first and second identities comprising a telephone dialling number;

establish, on the basis of said first and second identities received in said call party details, a separate communications session, separate from said telephone call, for the communication of data to and/or from said at least one other user device; and enable the download of a software component to be used in said separate communications session to said at least one other user device, said enabling comprising transmitting an identifier identifying a software component to be used in said separate communications session.

Further features and advantages of the invention will become apparent from the following description of preferred embodiments of the invention, given by way of example only, which is made with reference to the accompanying drawings.

DETAILED DESCRIPTION

Figure 1:
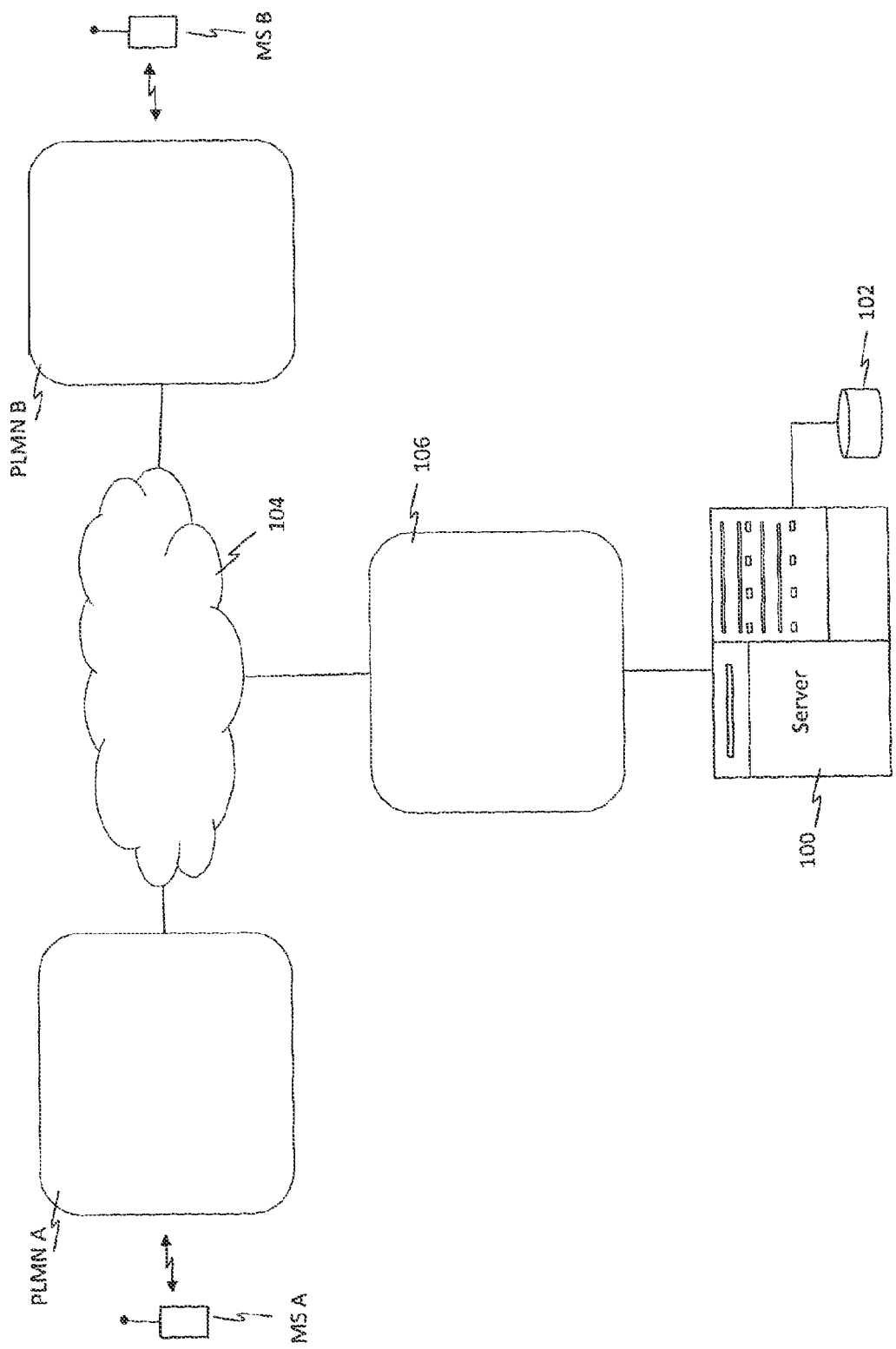
FIG. 1 is a system diagram according to embodiments of the invention.

FIG. 1 is a system diagram showing a data communications network according to embodiments of the present invention. These embodiments involve two mobile stations (MS) MS A and MS B which access public land mobile networks (PLMNs) PLMN A and PLMN B respectively via radio interfaces. MS A and MS B may be smart phones having data processing capabilities and operating systems.

PLMN A and PLMN B contain mobile telephony network infrastructure including one or more mobile switching centres, one or more base station controllers, and one or more base transceiver stations; the function of such entities is well known in the art and will not be described in detail here.

PLMN A and PLMN B are connected via a telecommunications network 104 comprising one or more Public Switched Telephone Networks (PSTNs) and/or packet networks. Telecommunications network 104 comprises one or more media and/or signalling gateway entities (not shown) for performing conversion between the various protocols and data formats used to transfer media and signalling data within and between the different networks. Server system 100 has an associated data store 102 and is connected to telecommunications network 104 via a packet network 106.

Although server system 100 is depicted as a single entity in FIG. 1, server system 100 may be a single device, a cluster of servers or servers distributed throughout the data communications network.

MS A has an associated identity in the form of a telephone dialling number (TDN), TDN A. MS B has an associated identity in the form of a telephone dialling number TDN B. MS A has communication session application software running on it with an associated application identifier AppID A. MS B also has communication session application software running on it with an associated application identifier AppID B.

In some embodiments of the invention, during installation of the application software on MS A, server system 100 may be informed of AppID A and creates a record for MS A in data store 102 containing AppID A stored in association with TDN A. Similarly, in some embodiments of the invention, during installation of the application software on MS B, server system 100 may informed of AppID B and creates a record for MS B in data store 102 containing AppID B stored in association with TDN B.

Figure 2:
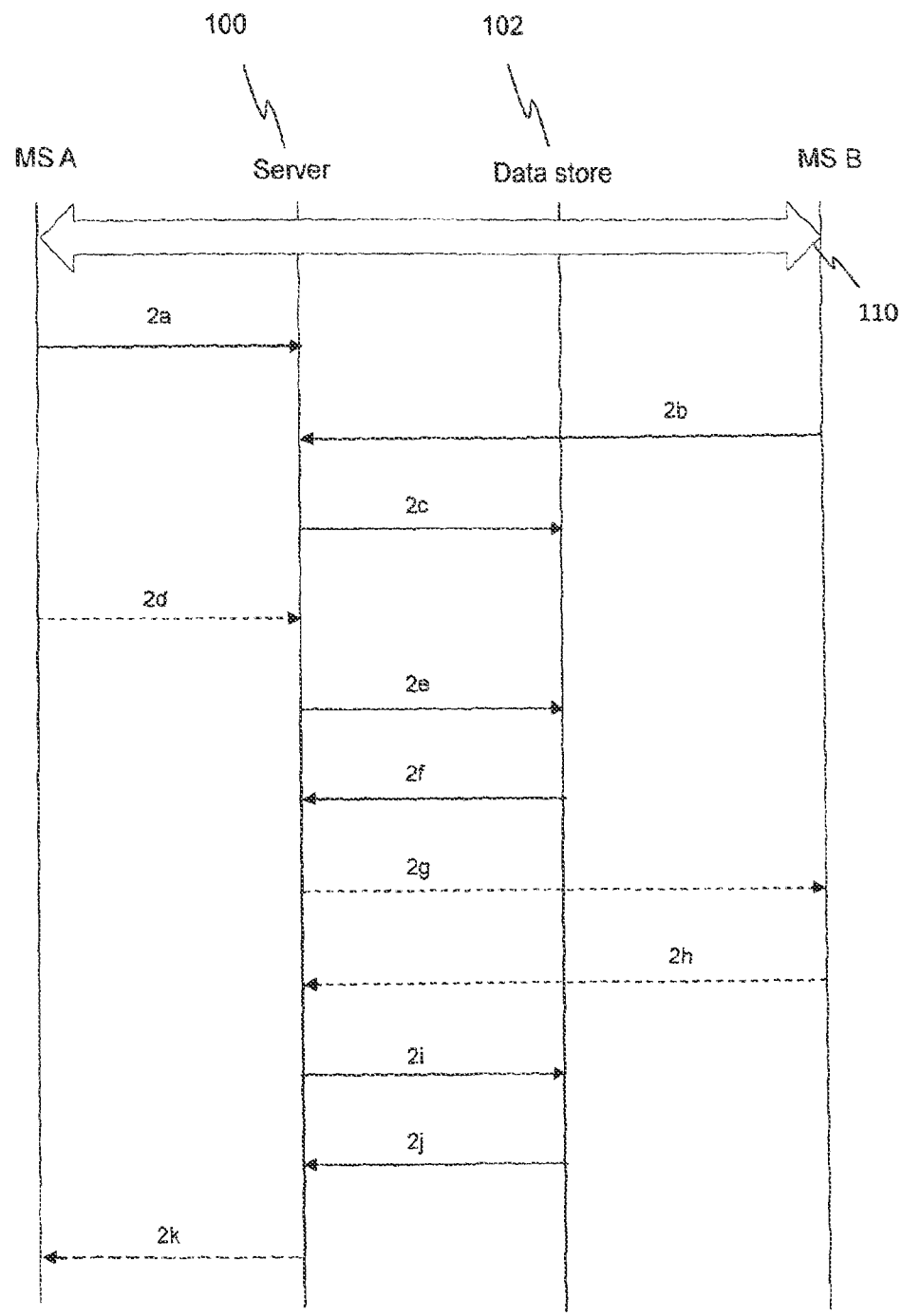
FIG. 2 is a flow diagram depicting operation of embodiments of the invention using the system of FIG. 1.

FIG. 2 is a flow diagram depicting operation of embodiments of the invention, for example implemented in a system depicted in FIG. 1.

In this and subsequent flow diagrams, solid arrows denote transfer of control, messaging or signalling data, whereas dashed arrows denote transfer of media or payload data.

A voice call is currently in progress between MS A in PLMN A and MS B in PLMN B, as shown by item 110. The voice call will typically be a circuit-switched voice call, the set-up and control for which is known in the art.

Application software running on MS A detects that there is a call in progress between MS A and MS B and notifies server system 100 of call party details for the call, e.g. the TDNs of telephones involved in the call, TDN A associated with MS A and TDN B associated with MS B, in step 2a. Similarly, application software running on MS B detects the call in progress between MS B and MS A and notifies server system 100 of call party details for the call, e.g. the TDNs of telephones involved in the call, TDN A associated with MS A and TDN B associated with MS B, in step 2b.

Application software running on MS A may detect that the call is in progress by registering with the operating system of MS A to be notified upon start of a call involving MS A. This could for example involve registering with an application programming interface (API) of the operating system of MS A associated with start and end of call events. A similar call detection process may occur on MS B.

In these embodiments, the user of MS A could be the calling or the called party for the call. Call party details are received from both telephony apparatus acting on behalf of the calling party and telephony apparatus acting on behalf of the called party for the call, e.g. telephony device MS A and telephony device MS B.

Server system 100 identifies that the notification of step 2a from MS A and notification of step 2b from MS B have call party details, TDN A and TDN B, in common and establishes a separate communications session, separate from the telephone call, for the communication of data between MS A and MS B. The separate communications session is established on the basis of the received call party details, TDN A and TDN B. The separate communications session is established whilst the telephone call is in progress, and is continued in parallel with the telephone call, such that voice call data is transmitted via the telephone call and other data may be transmitted via the communications session, after the establishment of the separate communications session.

Server system 100 updates the records for MS A and MS B in data store 102 to indicate that a call is in progress between MS A and MS B and that a communications session between MS A and MS B, separate to the voice call between MS A and MS B, has been established in step 2c.

Server system 100 may respond (not shown) to the notifications of steps 2a and 2b by responding with respective acknowledgements to MS A and MS B.

If MS A wants to communicate data to (e.g. share data with) MS B, it transmits the data to server system 100 in step 2d. Server system 100 performs a lookup in data store 102 using TDN A for MS A in step 2e and identifies that a communications session has been established between MS A and MS B. Server system 100 retrieves TDN B for MS B in step 2f and transmits the data received from MS A to MS B using the retrieved TDN B in step 2g.

In embodiments of the invention, the lookup in data store 102 of step 2e may also result in AppID B being retrieved. The data may then be transmitted to MS B using both TDN B and AppID B, with TDN B being used to locate MS B and AppID B being used to direct the data to the communications session application software running on MS B. The data may be transmitted by means of a push notification directed to AppID B of the communication session application on MS B. In the case of MS B being an Apple® iPhone®, the push notification could employ use of the Apple® Push Notification Service (APNS).

If MS B wants to send data to MS A, it sends the data to server system 100 in step 2h. Server system 100 performs a lookup in data store 102 using TDN B for MS B in step 2i and identifies that a communications session has been established between MS B and MS A. Server system 100 retrieves TDN A for MS A in step 2j and transmits the data received from MS B to MS A using the retrieved TDN A in step 2k.

In embodiments of the invention, the lookup in data store 102 of step 2j may also result in AppID A being retrieved. The data may then be transmitted to MS A using both TDN A and AppID A, with TDN A being used to locate MS A and AppID A being used to direct the data to the communications session application software running on MS A. The data may be transmitted by means of a push notification directed to AppID A of the communication session application on MS A.

In embodiments of the invention, the communication session is established in the form of a client-server relationship, with server system 100 acting as the server and each of MS A and MS B acting as clients. One connection is created between server system 100 and MS A and another connection is created between server system 100 and MS B. The two connections together create a channel between MS A and MS B through which data can be communicated in either direction.

In embodiments of the invention, server system 100 establishes client-server connections with MS A and MS B in response to receiving one or more client-server connection requests.

In embodiments of the invention, a client-server connection request is transmitted in response to the telephone call being established between MS A and MS B. In other embodiments, a client-server connection request is transmitted in response to initiation of a data communications service on MS A or MS B after the telephone call is established between them.

Each of the connections could be HyperText Transfer Protocol (HTTP) or HyperText Transfer Protocol Secure (HTTPS) connections.

To avoid loss of the channel between MS and MS B, the connections can be maintained by maintenance messages ('heartbeats') transmitted from server system 100 to MS A and MS B, for example transmitted at periodic intervals sufficiently short to prevent time-out of the connections due to inactivity, e.g. a client-server connection can be maintained by transmitting a message to keep the connection alive if the telephone call lasts more than a connection threshold period.

The data communicated via the session may comprise server system 100 receiving data identifying a downloadable resource, selected from the group consisting of a photographic image data file; a word processing document data file; a spreadsheet document data file; a presentation document data file; a video image data file; and streaming video, from one of MS A and MS B, during the separate communications session, and transmitting the data to the other of MS A and MS B, for example via the client-server connection.

In embodiments of the invention, the communications session between MS A and MS B can be maintained after the voice call is terminated allowing the users of MS A and MS B to continue communicating data between their user devices.

In alternative embodiments of the invention, the separate communications session is established via server system 100 and data is transmitted via a data communication path between MS A and MS B which is established on the basis of information received from said server, but with server system 100 not being including in the data communication path.

Server system 100 may receive a service data object from MS A or MS B during the separate communications session and transmit the service data object to the other of MS A and MS B.

Server system 100 may receive a service data object from MS A or MS B during the separate communications session, process the service data object in combination with additional service data to generate derived service data; and transmit the derived service data to the other of MS A and MS B.

Figure 3:
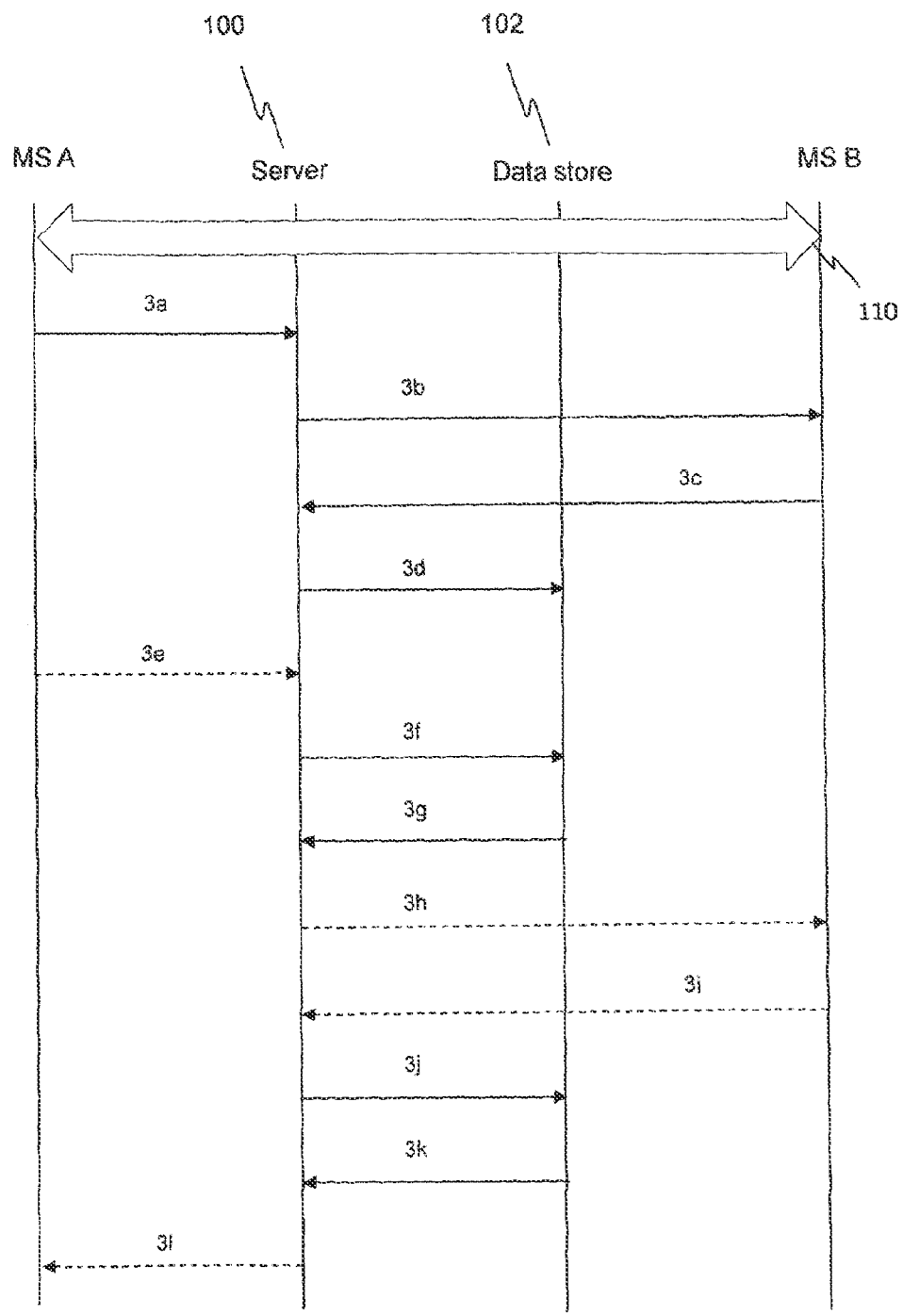
FIG. 3 is a flow diagram depicting operation of embodiments of the invention using the system of FIG. 1.

FIG. 3 is a flow diagram depicting operation of embodiments of the invention, for example implemented in a system depicted in FIG. 1. Similarly to FIG. 2 described above, a voice call is currently in progress between MS A in PLMN A and MS B in PLMN B, as shown by item 110.

Application software running on MS A detects that there is a call in progress between MS A and MS B and notifies server system 100 of call party details for the call, e.g. the TDNs of telephones involved in the call, TDN A associated with MS A and TDN B associated with MS B, in step 3a. Here, however, MS B does not have application software or any other capability which can detect the call with MS A and notify server system 100 of such. Instead, server system 100 notifies MS B of the receipt of call party details for the call from MS A by transmitting a separate communication session initiation request to MS B in step 3b. The communication session initiation request may cause a message such as "Do you want to establish a data communication session with the party you are speaking to?" or such like. If the user of MS B accepts the request by appropriate user input, MS B transmits a separate communication session initiation response to server system 100 in step 3c indicating that a communication session between MS B and MS A, separate to the voice call, should be established.

In these embodiments, the user of MS A could be the calling or the called party for the call. Call party details are received from either telephony apparatus acting on behalf of the calling party or telephony apparatus acting on behalf of the called party, e.g. MS A.

Once, the response of step 3c is received, server system 100 updates the records for MS A and MS B in data store 102 in step 3d to indicate that a call is in progress between MS A and MS B and that a separate communications session between MS A and MS B should be established.

Similarly to FIG. 2 described above, server system 100 establishes a separate communications session, separate from the telephone call, for the communication of data between MS A and MS B. The separate communications session is established on the basis of the received call party details, e.g. TDN A and TDN B, whilst the telephone call is in progress, and is continued in parallel with the telephone call, such that voice call data is transmitted via the telephone call and other data can be transmitted via the communications session, after the establishment of the separate communications session.

Communication of data from MS A to MS B can now occur in steps 3e to 3h by a similar process to that described above for steps 2d to 2g in relation to FIG. 2. Further, communication of data from MS B to MS A can now occur in steps 3i to 3l in a similar process to that described above for steps 2h to 2k in relation to FIG. 2.

Figure 4:
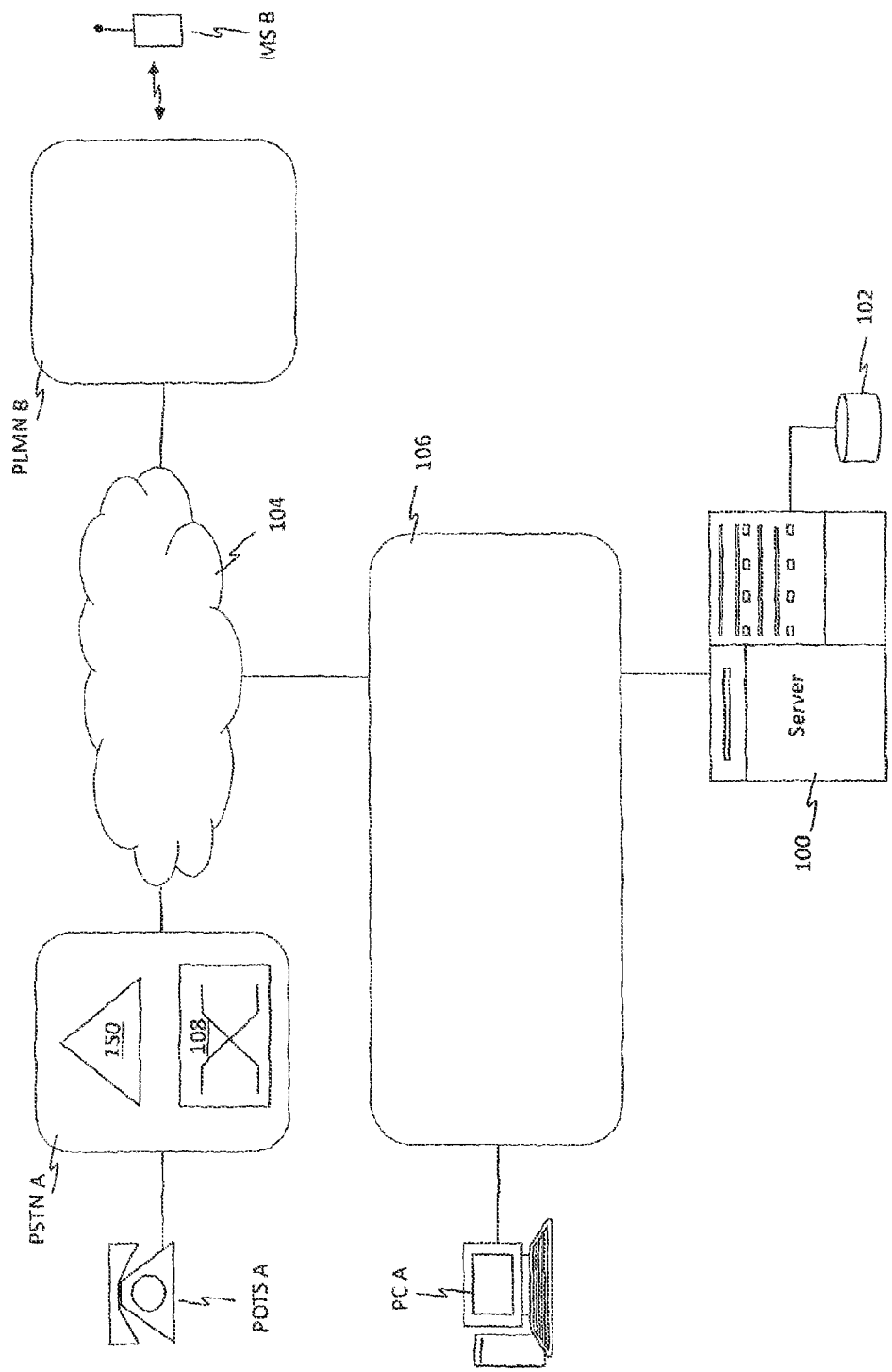
FIG. 4 is a system diagram according to embodiments of the invention.

FIG. 4 is a system diagram showing a data communications network according to embodiments of the present invention. FIG. 4 includes some entities similarly depicted and labelled to FIG. 1, with such entities functioning in a similar manner.

The embodiments of FIG. 4, however, involve an analogue telephone (sometimes referred to as a Plain Old Telephone Service (POTS) telephone or a 'black phone'), denoted POTS A, located in PSTN A, and a mobile station MS B located in PLMN B. PSTN A and PLMN B are connected via a telecommunications network 104 comprising one or more PSTNs and/or packet networks. Further, the user of POTS A also has an associated personal computer PC A connected to packet network 106.

In these embodiments of the invention, the user of POTS A cannot conduct communications sessions separate to voice calls conducted via POTS A just using POTS A alone. The user of POTS A therefore additionally employs PC A through which separate communications sessions can be conducted. To provide both voice calls via POTS A and separate communication sessions via PC A, POTS phone and PC A are coupled together logically.

POTS A has an associated telephone dialling number TDN A and MS B has an associated telephone dialling number TDN B. PC A has an associated network address in the form of an Internet Protocol (IP) address IP A in packet network 106. MS B has communications session application software running on it with an associated identifier AppID B.

PSTN A includes a network element 108 in the form of a call switching element, sometimes referred to as a Service Switching Point (SSP), which is capable of detecting whether a query should be raised in relation to calls to/from particular telephone dialling numbers by analysing in-call signalling information for the calls. Network element 108 acts on behalf of the user of POTS A and PC A and is configured to trigger a query, e.g. hand call control, to a service control point (SCP) network node 150 when it detects a predetermined call state for a call to/from TDN A associated with POTS A, for example by use of an Intelligent Network (IN) or Advanced Intelligent Network (AIN) call origination/termination trigger. SCP 150 is a network node responsible for deciding upon how such queries should be dealt with and acting accordingly, for example responding to network element 108 with appropriate instructions. The query from network element 108 to SCP 150 may pass via one or more Signalling Transfer Points (STPs) (not shown).

Upon receipt of in-call signalling information relating to a query from network element 108, SCP 150 is configured to trigger notification of such to server system 100. Any such notification to server system 100 will include call party details for the call, e.g. the TDNs of telephones involved in the call, TDN A associated with POTS A and TDN B associated with MS B.

Configuration of SCP 150 may involve storing an IP address for server system 100 in association with TDN A, such that when in-call signalling information relating to a call to/from POTS A is received, notification to server system 100 at the stored IP address is triggered.

In the embodiments of FIG. 4, POTS A has no communication session application software running on it. Further, POTS A has no capability to generate notifications when a call is outgoing from or incoming to POTS A.

Instead, PC A has communication session application software running on it for facilitating communication sessions according to embodiments of the invention.

During installation of the communication session application software on PC A, server system 100 is informed that PC A and POTS A are to be coupled together logically. PC A sends IP A and TDN A to server system 100 which creates a record for the user of POTS A and PC A in data store 102 containing IP A stored in association with TDN A. Similarly, during installation of the application software on MS B, server system 100 is informed of AppID B and creates a record for MS B in data store 102 containing AppID B stored in association with TDN B.

Figure 5:
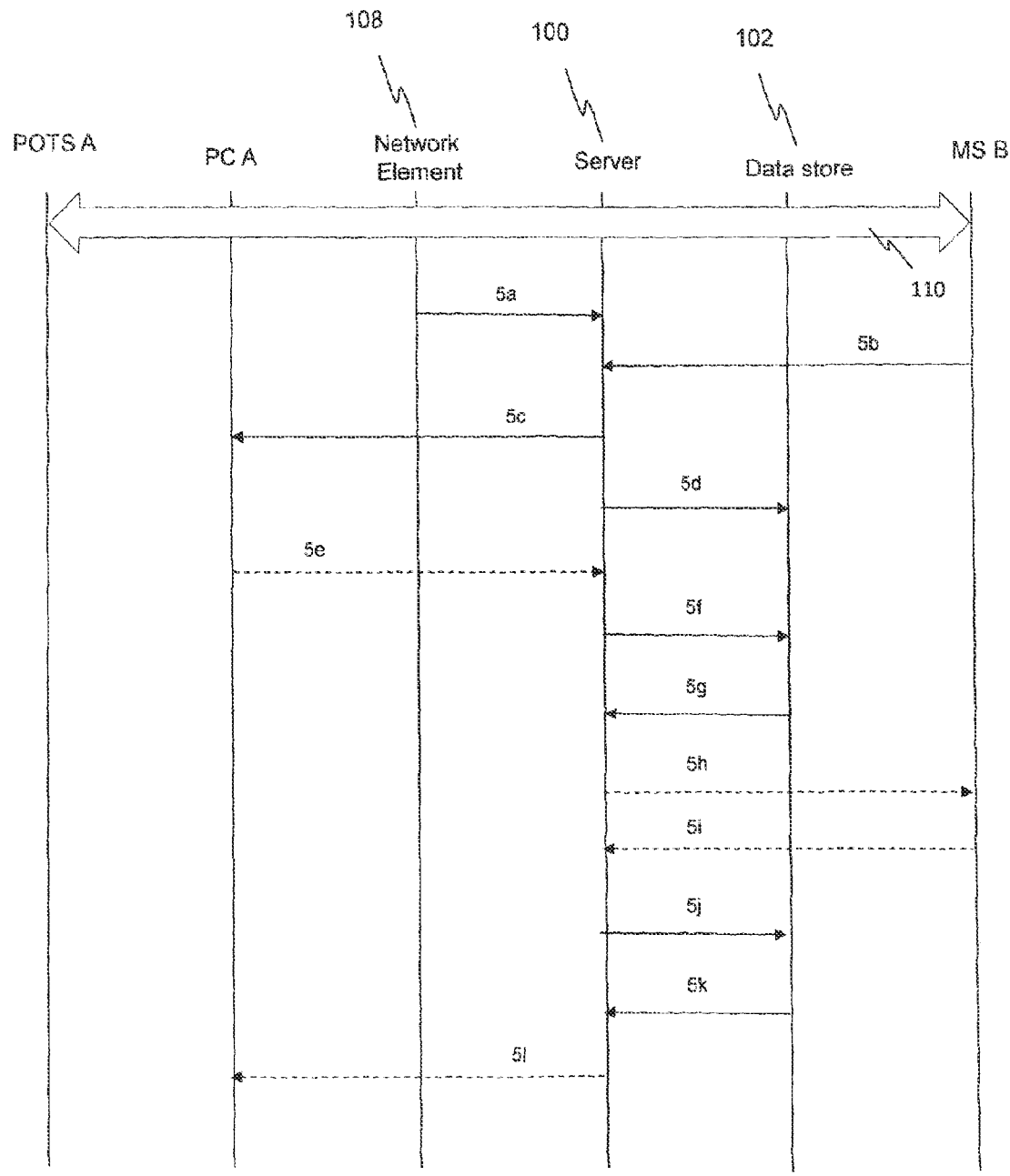
FIG. 5 is a flow diagram depicting operation of embodiments of the invention using the system of FIG. 4.

FIG. 5 is a flow diagram depicting operation of embodiments of the invention, for example implemented in a system depicted in FIG. 4. Similarly to FIG. 2 described above, a voice call is currently in progress between POTS A in PSTN A and MS B in PLMN B, as shown by item 110.

In the case of an outgoing call being made by POTS A to MS B, network element 108 receives in-call signalling information for the call, including TDN A, for which an AIN call origination trigger is configured. This triggers notification of call party details for the call to server system 100 in step 5a.

In the case of an incoming call being received by POTS A from MS B, network element 108 receives in-call signalling information for the call, including TDN, for which an AIN call termination trigger is configured. This triggers notification of call party details for the call to server system 100 in step 5a.

A call termination/origination trigger relating to a call to/from POTS A will include call party details for the call, e.g. the TDNs of telephones involved in the call, TDN A associated with POTS A and TDN B associated with MS B.

Application software running on MS B detects the call in progress between MS B and POTS A and notifies server system 100 of call party details for the call, e.g. the TDNs of telephones involved in the call, TDN A associated with POTS A and TDN B associated with MS B, in step 5b.

In these embodiments, the user of POTS A could be the calling or the called party for the call. Call party details are received from non-telephony apparatus acting on behalf of one of the call parties and from the telephony apparatus acting on behalf of the other of the call parties, e.g. network element 108 and MS B.

Server system 100 identifies that the notification of step 5a from network element 108 and the notification of step 5b from MS B have call party details, TDN A and TDN B, in common, e.g. server system 100 matches the call party details received on behalf of each respective party to the call.

Server system 100 maps the identity TDN A of POTS A to the network address for PC A, e.g. IP A, by reference to data store 102. Alternatively, IP A may be received during the call along with the call party details.

Server system 100 establishes a communications session, separate from the telephone call between POTS A and MS B, for the communication of data between PC A and MS B. The separate communications session is established on the basis of the received call party details, e.g. TDN A and TDN B. Once the separate communications session is established, voice call data is transmitted via the telephone call and other data can be transmitted via the separate communications session.

Server system 100 notifies PC A via IP A that a call has been detected between POTS A and MS B and that a separate communications session has been established between PC A and MS B in step 5c.

Server system 100 updates the records for POTS A/PC A and MS B in data store 102 in step 5d to indicate that a call is in progress between POTS A and MS B and that a separate communications session between PC A and MS B has been established.

If the user of POTS A and PC A wants to communicate data to MS B, the user sends the data using PC A to server system 100 in step 5e. Server system 100 performs a lookup in data store 102 using IP A for PC A in step 5f and identifies that a communications session has been established between PC A and MS B separately to the call taking place between POTS A and MS B. Server system 100 retrieves TDN B for MS B in step 5g and transmits the data received from PC A to MS B using the retrieved TDN B in step 5h.

In embodiments of the invention, the lookup in data store 102 of step 5f may also result in AppID B being retrieved. The data may then be transmitted to MS B using both TDN B and AppID B, with TDN B being used to locate MS B and AppID B being used to direct the data to the communications session application software running on MS B.

If the user of MS B wants to send data to the user of POTS A and PC A, the user of MS B sends the data to server system 100 in step 5i. Server system 100 performs a lookup in data store 102 using TDN A for POTS A in step 5j and identifies that a communications session has been established between PC A and MS B separately to the call taking place between MS B and POTS A. Server system 100 retrieves IP A for PC A in step 5k and transmits the data received from MS B to PC A using the retrieved IP A in step 5l.

In alternative embodiments of the invention, instead of both call party detail notifications being sent to server system 100 in steps 5a and 5b, server system 100 may instead notify MS B of the request from PC A to initiate establishment of a separate communications session in a similar manner to step 3b described above in relation to FIG. 3. Similarly to step 3c, MS B will then transmit a communication session initiation response (in response to user input on MS B indicating acceptance of the request) to server system 100 indicating that a communication session separate to the voice call between POTS A and MS B should be established between MS B and PC A.

Similarly to embodiments of the invention described above in relation to FIG. 2, the communication session is established in the form of a client-server relationship, with server system 100 acting as the server and each of PC A and MS B acting as clients. One connection is created between server system 100 and PC A and another connection is created between server system 100 and MS B. The two connections together create a channel between PC A and MS B through which data can be communicated in either direction.

In some embodiments of the invention, establishing the session comprises receiving a client-server connection request from PC A and establishing a client-server connection with PC A. In other embodiments of the invention, establishing the session comprises receiving a client-server connection request from MS B and establishing a client-server connection with MS B.

In embodiments of the invention, the client-server connection request is transmitted in response to the telephone call between POTS A and MS B being established. In other embodiments of the invention, the client-server connection request is transmitted in response to initiation of a data communications service on PC A after the telephone call between POTS A and MS B is established.

If the call between POTS A and MS B is terminated at any stage and server system 100 receives an indication of such, a notification message may be transmitted to PC A to inform it of a change of state of the separate communication session.

In alternative embodiments of the invention, network element 108 is a call initiating element, for example configured to initiate the establishment of the telephone call between POTS A and MS B in response to a remote click-to-dial website action by a user.

Figure 6:
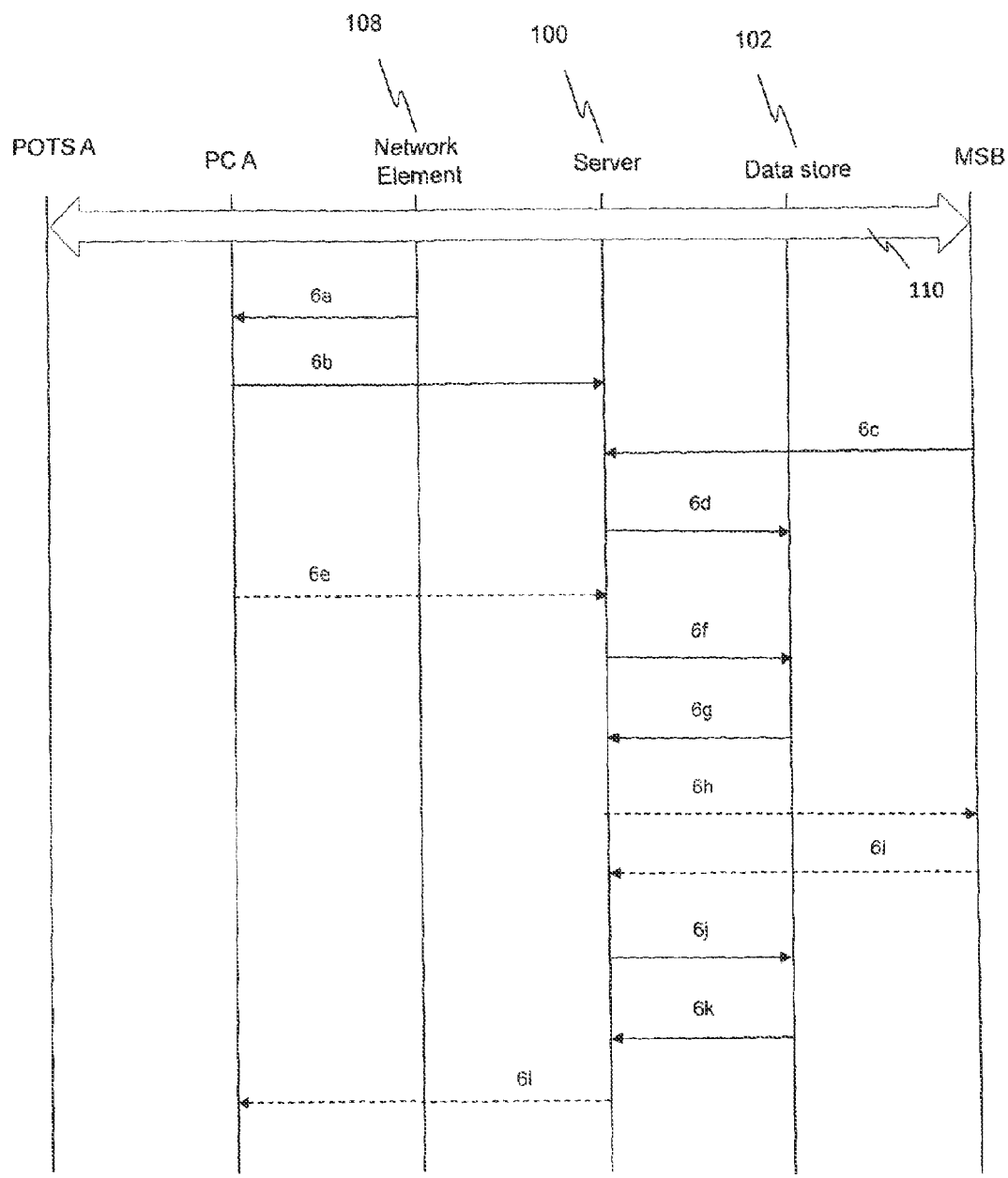
FIG. 6 is a flow diagram depicting operation of embodiments of the invention using the system of FIG. 4.

FIG. 6 is a flow diagram depicting operation of embodiments of the invention, for example implemented in a system depicted in FIG. 4. Network element 108 is configured similarly to network element 108 described above in relation to FIG. 4, e.g. when it detects a call to/from TDN A associated with POTS A, for example by use of an Advanced Intelligent Network (AIN) call origination/termination trigger, a query to SCP 150 is triggered. Here, however, SCP is configured such that upon receipt of in-call signalling information relating to a query from network element 108, notification to PC A is triggered, instead of notification to server system 100. Any such notification to PC A will include call party details for the call, e.g. the TDNs of telephones involved in the call, TDN A associated with POTS A and TDN B associated with MS B.

Configuration of SCP 150 may involve storing an IP address IP A for PC A in association with TDN A, such that when a call is received to/from POTS A, PC A can be notified at the stored IP address.

In the embodiments of FIG. 6, when network element 108 detects the call being conducted between POTS A and MS B, it transmits call party details for the call, TDN A and TDN B, to PC A in step 6a. PC A forwards the call party details notification, including TDN A and TDN B, to server system 100 in step 6b.

Application software running on MS B detects the call in progress between MS B and POTS A and notifies server system 100 of call party details for the call, e.g. the TDNs of telephones involved in the call, TDN A associated with POTS A and TDN B associated with MS B, in step 6c.

In these embodiments, the user of POTS A could be the calling or the called party for the call. Call party details are received from telephony apparatus acting on behalf of the calling party and telephony apparatus acting on behalf of the called party, e.g. PC A and MS B.

Steps 6d to 6l of FIG. 6 then proceed in a similar manner to steps 5d to 5l described above in relation to FIG. 5.

Figure 7:
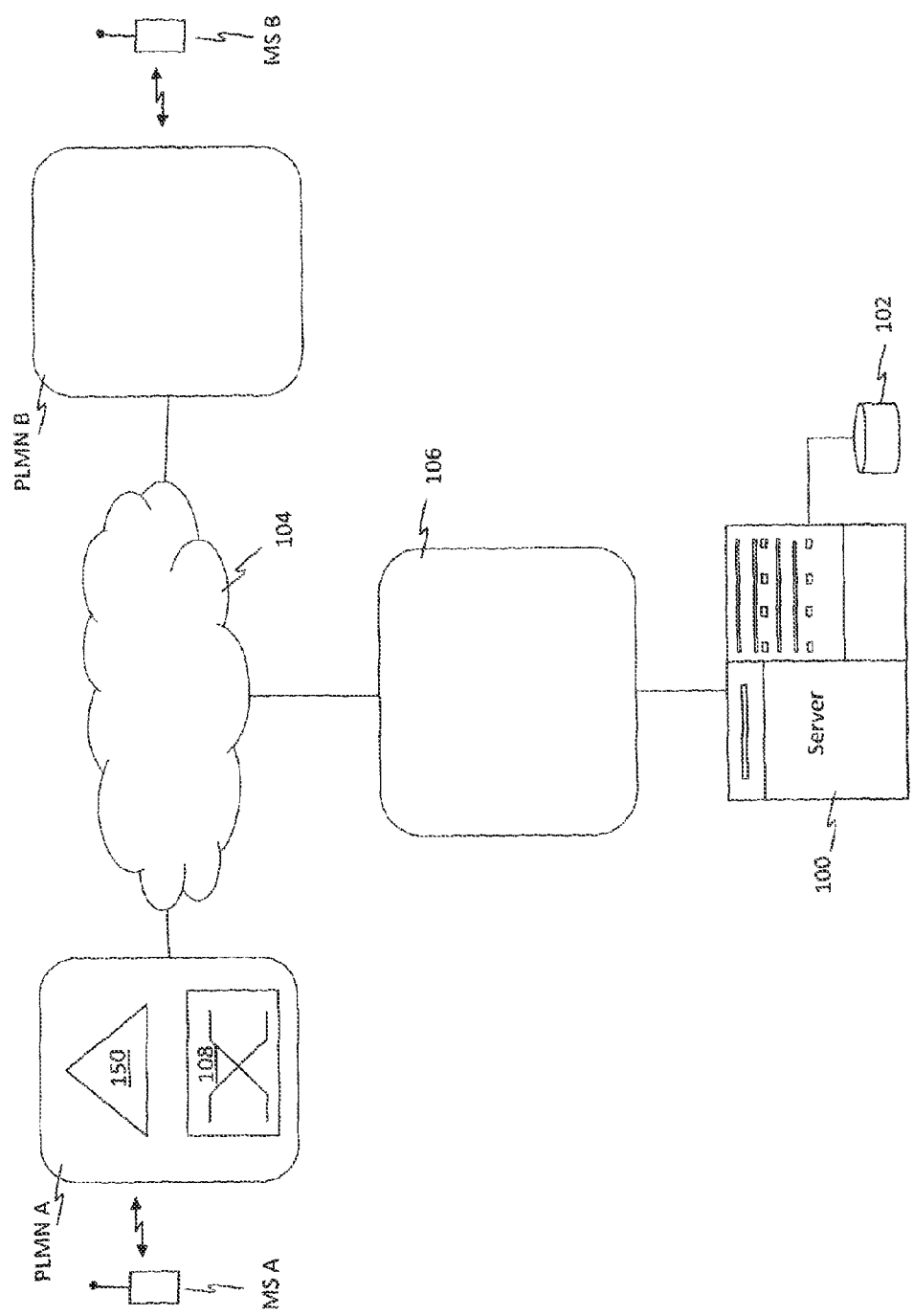
FIG. 7 is a system diagram according to embodiments of the invention.

FIG. 7 is a system diagram showing a data communications network according to embodiments of the present invention. FIG. 7 includes some elements similarly depicted and labelled to FIG. 4, with such elements functioning in a similar manner.

In the embodiments of FIG. 7, MS A has communication session application software running on it with an associated identifier AppID A. However, MS A does not have application software (or any other capability) for detecting calls to/from MS A and notifying server system 100 of such.

MS B has communication session application software running on it with an associated identifier AppID B. In addition, MS B has application software running on it which is capable of detecting calls to/from MS B and notifying server system 100 of such.

During installation of the communication session application software on MS A, server system 100 is informed of AppID A and creates a record for MS A in data store 102 containing AppID A stored in association with TDN A. Similarly, during installation of the communication session application software on MS B, server system 100 is informed of AppID B and creates a record for MS B in data store 102 containing AppID B stored in association with TDN B.

PLMN A includes a network switching element 108, for example an SSP, capable of generating queries in response to triggers configured for calls to/from MS A. Network element 108 of FIG. 7 generates queries to SCP 150 in a similar manner to network element 108 described above in relation to FIG. 4. The network element 108 of FIG. 4 generates queries in relation to wireline network triggers, for example Advanced Intelligent Network (AIN) triggers, generated within PSTN of FIG. 4. In FIG. 7, however, the queries are generated in relation to wireless network triggers such as Customised Applications for Mobile networks Enhanced Logic (CAMEL) or Wireless Intelligent Network (WIN) triggers.

Network switching element 108 is configured to trigger a query including in-call signalling information to a service control point (SCP) network node 150 when it detects a call to/from TDN A associated with MS A. Upon receipt of in-call signalling information relating to a query from network element 108, SCP 150 is configured to trigger notification of such to server system 100. Any such notification to server system 100 will include call party details for the call, e.g. the TDNs of telephones involved in the call, TDN A associated with POTS A and TDN B associated with MS B.

Configuration of SCP 150 may involve SCP 150 storing an IP address for server system 100 in association with TDN A, such that when in-call signalling information relating to a call to/from POTS A is received, notification to server system 100 at the stored IP address is triggered.

Figure 8:
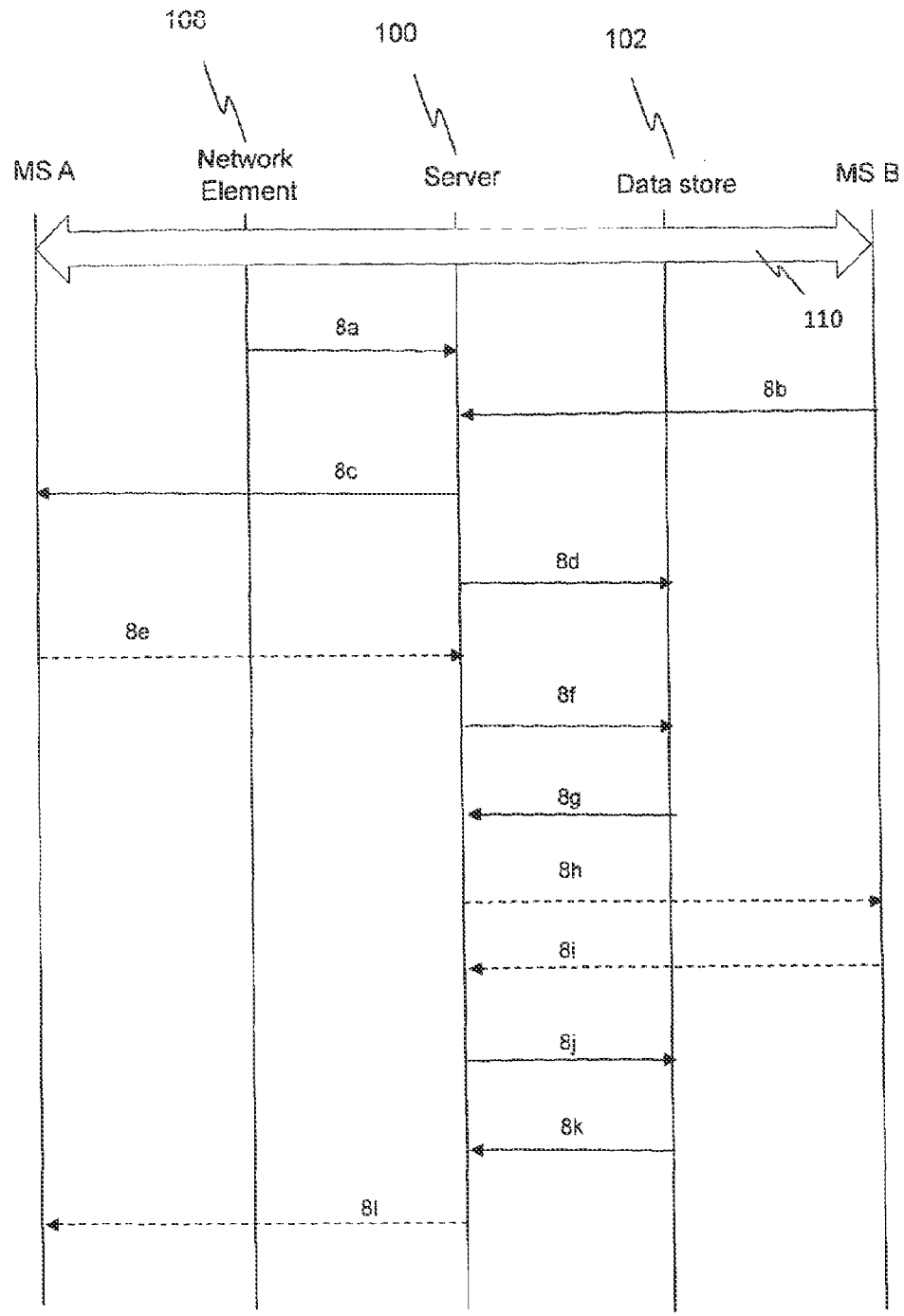
FIG. 8 is a flow diagram depicting operation of embodiments of the invention using the system of FIG. 7.

FIG. 8 is a flow diagram depicting operation of embodiments of the invention, for example implemented in a system depicted in FIG. 7. Similarly to FIG. 2 described above, a voice call is currently in progress between MS A in PLMN A and MS B in PLMN B, as shown by item 110.

In the case of an outgoing call being made by MS A to MS B, network element 108 receives in-call signalling information for the call, including TDN A, for which a wireless call origination trigger is configured. This triggers notification of call party details for the call to server system 100 in step 8a.

In the case of an incoming call being received by MS A from MS B, network element 108 receives in-call signalling information for the call, including TDN A, for which a wireless call termination trigger is configured. This triggers notification of call party details for the call to server system 100 in step 8a.

A call termination/origination trigger relating to a call to/from MS A will include call party details for the call, e.g. the TDNs of telephones involved in the call, TDN A associated with MS A and TDN B associated with MS B.

Application software running on MS B detects the call in progress between MS B and MS A and notifies server system 100 of call party details for the call, e.g. the TDNs of telephones involved in the call, TDN A associated with MS A and TDN B associated with MS B, in step 8b.

In these embodiments, the user of POTS A could be the calling or the called party for the call. Call party details are received from telephony apparatus acting on behalf of the calling party and telephony apparatus acting on behalf of the called party, e.g. network element 108 and MS B.

Server system 100 identifies that the notification of step 8a from network element 108 and the notification of step 8b from MS B have call party details, TDN A and TDN B, in common and establishes a communications session, separate from the telephone call between MS A and MS B, for the communication of data between MS A and MS B. The separate communications session is established on the basis of the received call party details, e.g. TDN A and TDN B. Once the separate communications session is established, voice call data is transmitted via the telephone call and other data can be transmitted via the separate communications session.

Server system 100 notifies MS A that a call has been detected between MS A and MS B and that a separate communications session has been established between MS A and MS B in step 8c.

Server system 100 updates the records for MS A and MS B in data store 102 in step 8d to indicate that a call is in progress between MS A and MS B and that a separate communications session between MS A and MS B has been established.

Communication of data from MS A to MS B can now occur in steps 8e to 8h by a similar process to that described above for steps 2d to 2g in relation to FIG. 2. Further, communication of data from MS B to MS A can now occur in steps 8i to 8l in a similar process to that described above for steps 2h to 2k in relation to FIG. 2.

In alternative embodiments of the invention, instead of both call party detail notifications being sent to server system 100 in steps 8a and 8b, server system 100 may instead notify MS B of the request from MS A to initiate establishment of a separate communications session in a similar manner to step 3b described above in relation to FIG. 3. Similarly to step 3c, MS B will then transmit a communication session initiation response (in response to user input on MS B indicating acceptance of the request) to server system 100 indicating that a communication session separate to the voice call between MS A and MS B should be established between MS B and MS A.

Figure 9:
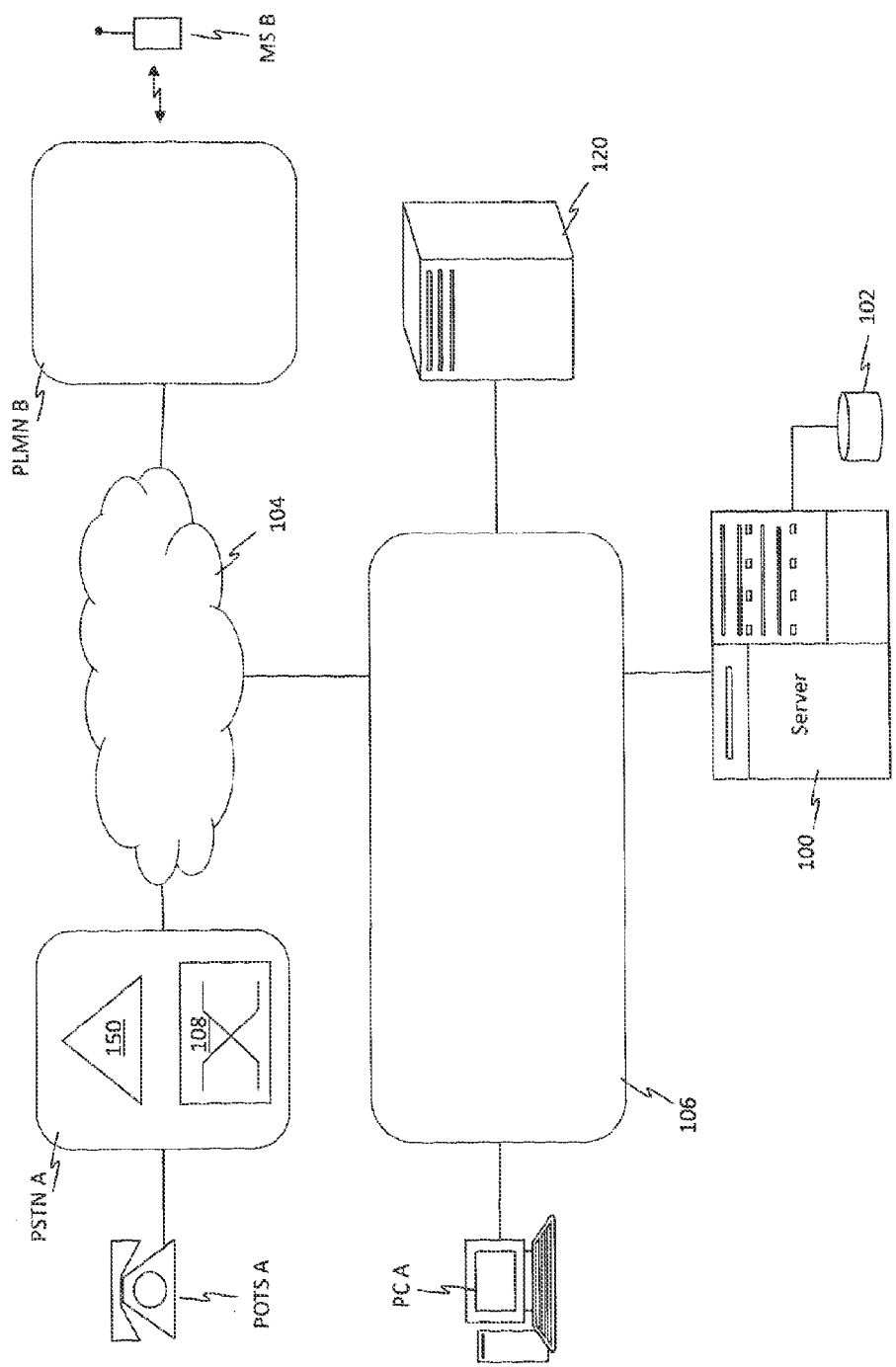
FIG. 9 is a system diagram according to embodiments of the invention.

FIG. 9 is a system diagram showing a data communications network according to embodiments of the present invention. FIG. 9 includes some entities similarly depicted and labelled to FIG. 4, with such entities functioning in a similar manner. In addition, the system of FIG. 9 includes a content server 120 connected to packet network 106 at which electronic content can be provided, for example via electronic download. The electronic content could comprise software components such as applications or plug-ins, or media data such as music, videos, computer games, etc.

Figure 10:
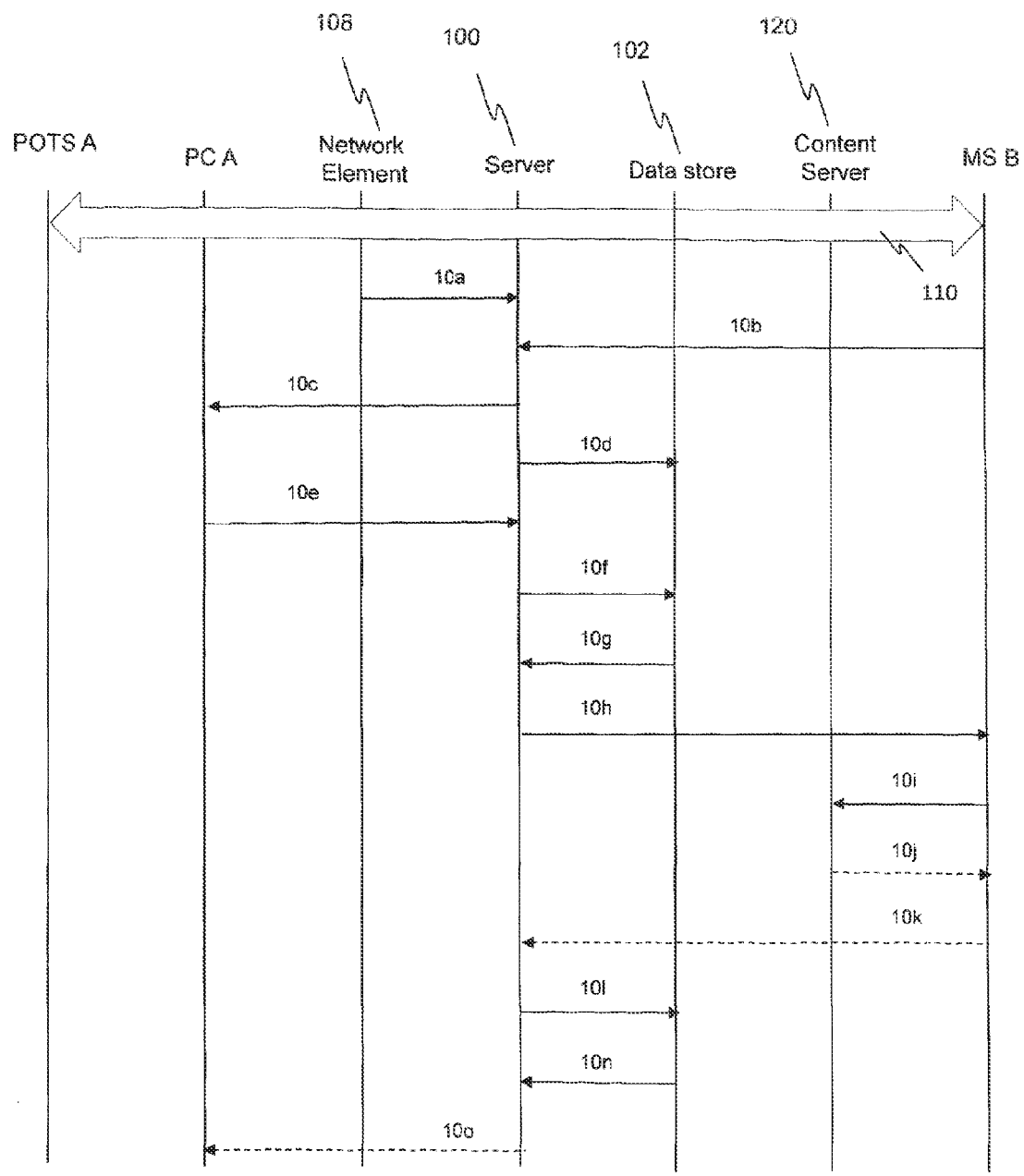
FIG. 10 is a flow diagram depicting operation of embodiments of the invention using the system of FIG. 9.

FIG. 10 is a flow diagram depicting operation of embodiments of the invention, for example implemented in a system depicted in FIG. 9. Similarly to FIG. 5 described above, a voice call is currently in progress between POTS A in PSTN A and MS B in PLMN B, as shown by item 110.

Similarly to steps 5a to 5d described above in relation to FIG. 5, steps 10a to 10d of FIG. 10 depict detection of a voice call between POTS A and MS B by network element 108 and notification of such to server system 100, detection of the call between POTS A and MS B by MS B and notification of such to server system 100, establishment of a separate communications session between PC A and MS B and notification of such to PC A, and updating of data store 102.

In these embodiments, the user of POTS A and PC A wishes to use a software component in the separate communications session with MS B and transmits from PC A an identifier for the software component, for example an application name, file name or Uniform Resource Locator (URL), to server system 100 in step 10e. The software component may for example comprise a plug-in relating to the communications session application software installed on MS B and PC A.

Server system 100 performs a lookup in data store 102 using IP A for PC A in step 10f and identifies that a communications session, separate to the voice call between POTS A and MS B, has been established between PC A and MS B. Server system 100 retrieves TDN B for MS B in step 10g and proceeds to enable download of the software component by MS B.

Server system 100 enables the download by transmitting the identifier for the software component received from PC A to MS B in step 10h. The identifier could be transmitted to MS B embedded in a text message such as an SMS message.

Using the received software component identifier, MS B sends a download request for the software component to content server 120 in step 10i. Content server then provides the software component to MS B in step 10j.

If the user of MS B wants to communicate data relating to use of the software component to the user of POTS A and PC A, MS B transmits such data to server system 100 in step 10k. When server system 100 receives the data from MS B in step 10k it performs a lookup in data store 102 using TDN B for MS B in step 10l and identifies that a separate communications session has been established between PC A and MS B. Server system 100 retrieves IP A for PC A in step 10n and transmits the data received from MS B to PC A in step 10o. Data may be communicated from PC A to MS B in a similar manner as per steps 2h to 2k described above in relation to FIG. 2.

When server system 100 receives the software component identifier in step 10e, it may identify that further information is required for downloading the software component, for example if only an application name is supplied by PC A. The further information could include an IP address, domain name or URL for locating content server 120 in packet network 106; such further information may be stored locally to server system 100 or could be obtained via a search or query process carried out by server system 100 within packet network 106 or beyond. In such a case, server system 100 will additionally provide such further information to MS B in step 10h.

In alternative embodiments of the invention, when server system 100 receives the software component identifier in step 10e, it performs a lookup in data store 102 and identifies that that a separate communications session has been established between PC A and MS B. Server system 100 then downloads the software component from content server 120 itself using the software component identifier received from PC A, and transmits the software component directly to MS B.

In further alternative embodiments of the invention, instead of PC A transmitting an identifier for the software component to server system 100 as per step 10e, PC A transmits the software component itself to server system 100. Server system 100 performs a lookup in data store 102 and identifies that that a separate communications session has been established between PC A and MS B and transmits the software component received from PC A to MS B.

In embodiments of the invention, before download of the software component to MS B or PC A is enabled, a capability check is conducted to determine whether MS B or PC A is initially enabled with the software component. If the capability check indicates that the respective user device is not initially enabled with the software component, then enabling of the download may proceed.

In some embodiments, capability data for one or more user devices is stored in data store 102 and server system 100 may carry out a capability check by reference to data store 102. In other embodiments, the capability check involves transmitting a capability query to a user device, and receiving a response indicating whether said the device is initially enabled with the software component.

In embodiments of the invention, the separate communications session is established using a session establishment software application or operating system function on the user device to which the software component is being downloaded to and the software component is a software application which interoperates with the session establishment software application or operating system function.

In embodiments of the invention, a client-server connection request is transmitted by the user device to which the software component is being downloaded to server system 100 and a client-server connection is established between server system 100 and that device. The software component is transmitted via the established client-server connection. The client-server connection request could be transmitted in response to the telephone call being established or in response to a notification received during the telephone call, after the telephone call is established.

Figure 11:
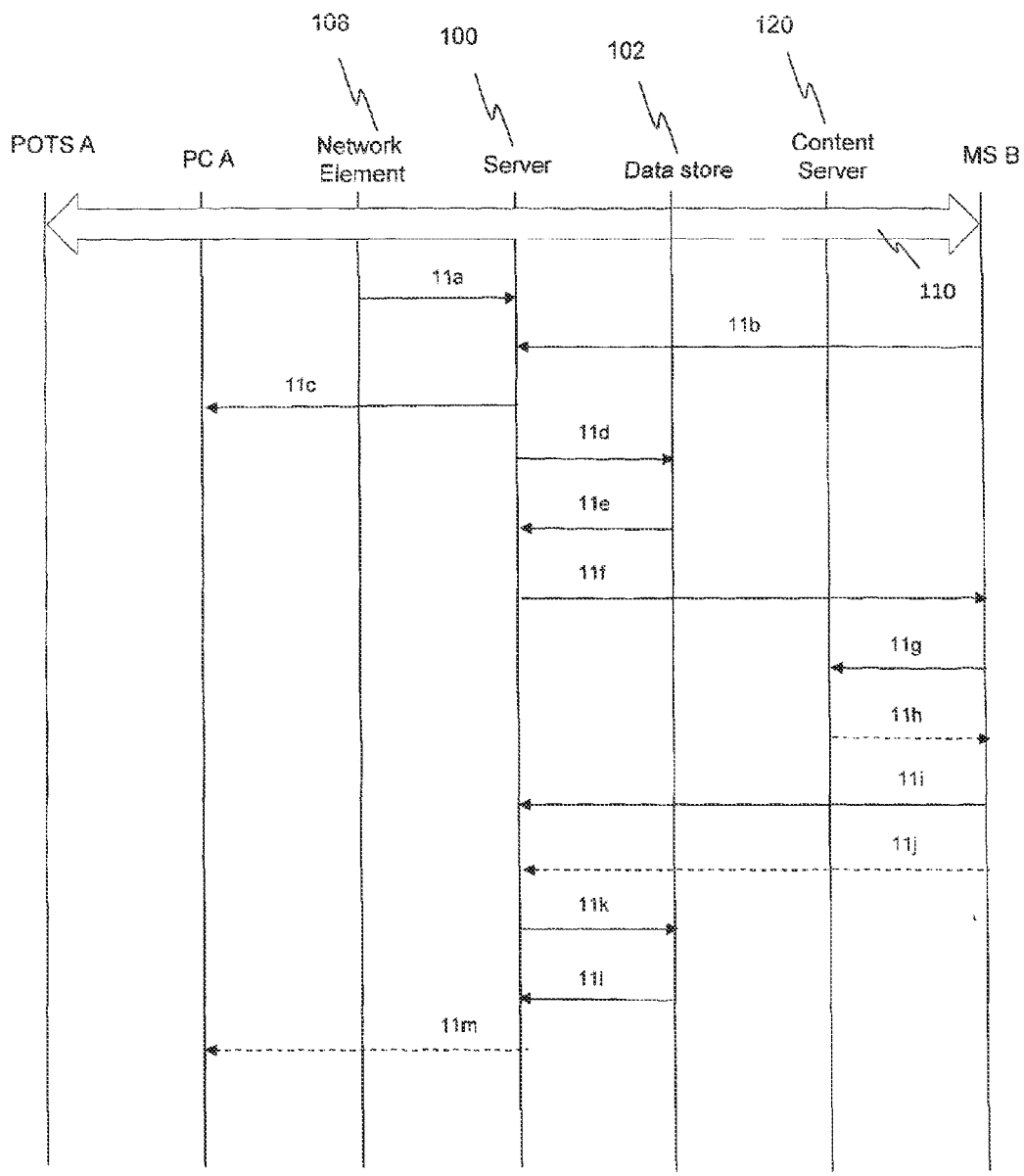
FIG. 11 is a flow diagram depicting operation of embodiments of the invention using the system of FIG. 9.

FIG. 11 is a flow diagram depicting operation of embodiments of the invention, for example implemented in a system depicted in FIG. 9. Similarly to FIG. 10 described above, a voice call is currently in progress between POTS A in PSTN A and MS B in PLMN B, as shown by item 110.

Steps 11a to 11c of FIG. 11 depict detection of a voice call between POTS A and MS B by network element 108 and notification of call party details for such to server system 100, detection of the call between POTS A and MS B by MS B and notification of call party details for such to server system 100, as well as notification of the detected call to PC A.

When server system 100 receives the call party details for the call between POTS A and MS B in steps 11a and 11b, it performs a lookup in data store 102 for the TDNs of MS A and MS B in step 11d. From the lookup information received in step 11e, server system 100 identifies that MS B is an initially non-enabled user device that does not currently have a capability associated with participating in a communication session separate to the voice call between POTS A and MS B.

For example, a data record for MS B in data store 102 may indicate that MS B does not have communications session software installed on it, or there may be no data record at all for MS B in data store 102 which also indicates that MS B does not have communications session software installed on it.

In these embodiments, in order to provide the initially non-enabled user device MS B with the capability associated with participating in the session, server system 100 enables the download of a software application to the initially non-enabled user device MS B.

Server system 100 enables the download of the software application by transmitting an identifier for the software application to MS B in step 11f. The identifier could be transmitted to MS B embedded in a text message such as an SMS message.

Using the received software application identifier, MS B sends a download request for the software application to content server 120 in step 11g. Content server then provides the software application to MS B in step 11h.

MS B proceeds to install the software application, which when installed, sends an installation confirmation message to server system 100 in step 11i. Server system 100 is now able to establish a communications session between PC A and MS B which is separate to the voice call being conducted between POTS A and MS B.

Once the separate communications session between MS B and PC A is established, MS B may communicate data to PC A as shown in steps 11j to 11m in a similar manner to steps 5i to 5l as described above in relation to FIG. 5. Further, communication of data from MS B to MS A can now occur (not shown) in a similar process to that described above for steps 5e to 5h in relation to FIG. 5.

In embodiments of the invention, establishment of the separate communications session may be initiated by the user of POTS A and PC A, for example by user input on PC A. The user input causes communications session software installed on PC A to transmit a communications session initiation request message to server system 100 which then proceeds to establish a separate communications session as described above.

The above embodiments are to be understood as illustrative examples of the invention. Further embodiments of the invention are envisaged.

The above described embodiments primarily relate to telephony devices having associated identities in the form of telephone dialling numbers. In other embodiments of the invention, one or more, or all of the identities could be non-telephone-dialling-numbers, for example usernames, email addresses etc. Where non-telephone-dialling-number identities are employed, mappings between non-telephone-dialling-number identities and telephone dialling number identities may be stored in data store 102 and used by server system 100 for converting from non-telephone-dialling-number identities to telephone dialling numbers after receipt of the call party details The personal computer PC A described above could alternatively be another device or combination of devices with corresponding data processing, display and data input capabilities, for example a television, a smart television, a general purpose desktop computer terminal, a general purpose laptop computer terminal, a general purpose tablet computer terminal, an in-car computing and communications system a satellite navigation system, games console, or any combination thereof.

In embodiments of the invention described above, telephone calls to/from mobile stations and POTS phones are detected either by application software running on the mobile stations or by a telephony apparatus configured accordingly. In alternative embodiments of the invention, during a voice call, a party to the call uses a computing terminal to enter in call party details (for example the calling and called party telephone dialling numbers) for the call via a web server interface. The web server interface passes the call party details to server system 100 which can then establish a communications session, separate to the voice call, on the basis of the calling and called party telephone dialling numbers received from the web server interface.

The logical coupling between user devices for a user may be temporary or more permanent. If for example a user has a POTS phone and a PC as their user devices in their home, then these devices will tend to be used by the user on a fairly permanent basis, so the logical coupling would tend to be more permanent. If for example a user has a mobile phone and a satellite navigation system in their car, then the logical coupling between the two devices may only be valid when the user is in or near their car, so the logical coupling would only be maintained temporarily when the two devices are within close enough proximity of each other.

The logical coupling between a user's devices can be activated (or otherwise triggered) by a variety of different processes. One example could involve communication between a smartphone and a satellite navigation system via a short wave radio interface (such as a Bluetooth™ interface) in order to couple the two devices together locally, along with subsequent registration of details of such with server system 100. Another example could be registration of device details via a website. A further example might involve registration by a service engineer when installing a telephone and set-top box combination. Alternatively, registration could be carried out over the telephone verbally to an administrative operator, or via an Interactive Voice Response (IVR) system.

The above embodiments of the invention describe telephone calls and establishment of communications sessions for user devices of two parties. All embodiments of the invention can be applied to user devices of multiple parties numbering more than two. When the multiple parties are conducting a multi-leg teleconference, a communications session can be created between all of their user devices, allowing communication of data, not just between two user devices, but between many different combinations of user devices, i.e. multi-branch data communication.

The connections between server system 100 and the user devices are described above as being HTTP or HTTPS connections. In alternative embodiments of the invention, the connections could be peer-to-peer connections such that data is communicated between the user devices through a number of peer-to-peer nodes. Creating the peer-to-peer connections may involve use of processes for traversing firewalls, for example using protocols such as the Simple Traversal of User Datagram Protocol (UDP) Through Network Address Translators (NATs) (STUN) protocol.

Further alternatively, the connections could initially be created as HTTP or HTTPS connections between server system 100 and the user devices, but then could be migrated to peer-to-peer connections according to network topography and/or current network load.

Embodiments of the invention described above involve communication of different types of data during a communication session, for example software component identifiers, software applications, feature identifiers, authorisation requests, authorisation indications, geographical location data, etc. Any of these different types of data may be communicated between the various combinations of devices in the above described embodiments, including mobile station to mobile station and mobile station to PC, both with or without use of telephony apparatus for call detection.

In the above-described embodiments, both call parties transmit, either from the telephony device, or an associated device, call party identifiers for each party to the server system 100 in the process of setting up the separate data communications session. These call party identifiers are, in the embodiments described, both telephony dialling numbers (TDNs). In alternative embodiments of the invention, one party or both parties may be identified by another form of call party identifier, using for example one or more lookup mechanisms which map a telephony dialling number to a different unique identifier and/or vice-versa (examples of such alternatives are described in further detail below.) However, such lookup mechanisms may increase latency and may introduce unexpected errors (e.g. if a lookup database such as an address book is not kept up to date.) Hence, whilst it is not indeed necessary for either party to transmit a telephony dialling number of either party (since either party may be identified by other mechanisms), it is preferred that at least one of the devices includes the telephony dialling number of the other party. Indeed, whilst it is again not necessary, it is preferred that both parties transmit the telephony dialling number of the other party, if available, to the server system 100, during the session setup. Furthermore, in order at least to reduce latency at the server, and/or to reduce the need to maintain a separate store of identities and/or to reduce the need to implement a registration mechanism, it is preferred that both parties transmit both their own telephony dialling number and the telephony dialling number of the other party, if available, to the server system 100, during the session setup. If a call party is identifiable using an additional identifier, such as an extension number or a conference call ID, the additional identifier is preferably transmitted in association with both of the telephony dialling numbers, if available, by one or each party to the call.

As mentioned above, in alternative embodiments of the invention, one, or each, of the call parties may transmit, either from the telephony device, or an associated device, a unique identifier in the form other than that of a telephony dialling number which is nonetheless recognisable by the server system 100. A user device which interacts with the server may thus transmit the unique identifier to identify one party, or both parties, as a party to the call, instead of a telephony dialling number. For example, the server system 100 may have access to a data store which includes a set of unique identifiers for all subscribers registered to receive the service provided by the server system 100, along with a corresponding telephony dialling number for a telephony device associated with each respective unique identifier. Such unique identifiers may be allocated by the server system 100 during an initial registration procedure, and notified to, and stored by, an application on the user device which interacts with the server system 100 during the registration procedure. Other globally unique identifiers, such as email addresses, Facebook™ IDs, etc. may be used alternatively, or in addition, to such allocated unique identifiers.

In embodiments of the invention, at least one of the two call parties may use a Voice-over-Internet-Protocol (VoIP) enabled device or other device employing the session Initiation Protocol (SIP). One, or each, party may be identified in the call setup procedures by means of a unique SIP user identifier which may include a telephone dialling number as a user identifier or a user identifier other than a telephony dialling number, for example a SIP identifier in the form of username@hostname. Thus, a SIP user identifier can be transmitted to the server system 100 as a call party identifier identifying at least one, or each, participant in the call.

In embodiments of the invention, a call party identifier may take the form of an Internet Protocol (IP) address, which may be either a static or dynamically allocated IP address. This may for example be the IP address which a user device transmits to the server system 100 in a client-server connection setup request, for example an HTTP setup request, when establishing a leg of the communications session. This may uniquely identify the call party associated with the device making the request. If for example, a given party sends the telephony dialling number of only the other party to the server system 100 in the session setup procedure, then that given party can nevertheless be identified as a party to the call using the IP address of that given party's device used in establishing the session leg. The supplied IP address may then be used to send data to that given party's device throughout the ensuing communications session, even if the IP address is only temporarily allocated to the user device as a dynamic IP address. Hence, a static or dynamic IP address may be used, in some embodiments of the invention, to identify a call party and may be one of the call party identifiers which forms part of the call party details transmitted to the server system 100, e.g. in a connection setup request during session establishment.

In embodiments of the invention, a call party identifier may take the form of a session identifier, or other unique identifier, generated by the server system 100 and received from the server system 100 by a user device in a push notification message. Such a push notification message may be sent from the server in response to the server receiving call party details from the other party to the call, in a first communication session leg. The push notification message is configured, on receipt, to trigger the user device to set up a second communication session leg with the server system 100. The user device may be configured to include the identifier received in the push notification as a call party identifier in a client-server connection setup request, for example an HTTP setup request, when establishing the communications session leg in response to the push notification message. This may uniquely identify the call party associated with the device making the request, since such identifier may be mapped to the telephony dialling number, or other call party identifier, by the server system 100. Hence, an identifier received in a push notification message may be used, in some embodiments of the invention, to identify a call party and may be one of the call party identifiers which forms part of the call party details transmitted to the server system 100, e.g. in a connection setup request during session establishment.

A unique identifier in any of the various forms described above, in a form other than that of a telephony dialling number, may be used to identify a given party to the call, in call party details transmitted by a user device associated with that given party. A unique identifier in any of the various forms described, in a form other than that of a telephony dialling number, may in addition, or in the alternative, be used to identify another party to the call, in call party details transmitted by that given party. The server system 100 may supply the unique identifiers of other parties, using e.g. a synchronization process for populating an address book locally stored on the user device with such identifiers. Alternatively, such unique identifiers of other parties may already be stored by, or manually added by a user of the device, in the local address book. Further alternatively, the unique identifiers may be stored in a global address book stored on a remote device. At least one of the two parties may have a user device which is configured to look up, from a local data store (e.g. a local address book) or a remote data store (e.g. a global address book), a correspondence between the other party's telephone dialling number, or other received unique identifier, and a different unique identifier. The different unique identifier may then be used instead to identify the other party to the call in the call party details transmitted by at least one side of the call to the server system 100.

In the above, various forms of alternative call party identifiers are described. Whatever form the supplied unique identifier takes, the server system 100 may have a corresponding database and lookup mechanism to map a supplied unique identifier to a different call party identifier, such as a telephony dialling number, whereby to match both session legs together as relating to a particular current telephone call, using the information supplied in each respective one of the session legs. The server can then bridge the two session legs together, or otherwise associate the two session legs, to create a separate communications session between the participants in a currently ongoing call.

In the above described embodiments, whilst a different form of call party identifier may be used in some cases, in a generally accessible telephony system at least one of the two parties may have no access to identifying details other than the telephony dialling number of the other call party when the call is established. Hence, it is preferable that the system is configured such that at least one of the two parties may transmit the call party identifier of the other party to the server system 100 in the form of a telephony dialling number, and that the server system 100 is able to process one or more call party details in such a form in order to establish the separate communications session.

In alternative embodiments of the invention, rather than both call parties transmitting both calling party and called party identifiers to identify the parties to a call, at least one of the parties may transmit only one of the two call party identifiers to the server system 100. This may be done according to a predetermined convention, e.g. a convention which determines that the calling party should always transmit both identifiers but the called party need only transmit one identifier (or vice-versa). Again, the server system 100 is nevertheless able to match both session legs together as relating to a particular current telephone call, using the information supplied in both of the session legs. In this case, it is sufficient that at least one common call participant, namely that participant which is determined by convention to be identified by each party to the call, has been identified in each session leg.

In some circumstances, the telephony dialling number, or other call party identifier, of the other party may not be received at all during the call setup procedures. For example, the other party may use a number withholding service. Hence, an identifier for the other party may not be available to the user device. In this case, the user device may be able, during the setup of the separate communications session, to identify only its associated call party (and not the other call party) to the server system 100 as a party to the call. However, providing both sides of the call do not use a number withholding service, the other party's device may be able identify both parties to the call, and preferably transmits call party details identifying both call parties to the server system 100 during session establishment. Again, the server system 100 is nevertheless able to match both session legs together as relating to a particular current telephone call, using the information supplied in both of the session legs. Again, in this case, it is sufficient that at least one common call participant, namely the participant not using a number withholding service, has been identified in both session legs.

In the above-described embodiments the mobile stations MS A, MS B communicate via a PLMN. Such a PLMN may be any of a variety of different cellular communications network types, including a 2G network such as a Global System for Mobile communications (GSM) network, a 3G network, such as a Universal Mobile Telecommunications System (UMTS) network or a 4G network such as a Long Term Evolution (LTE or LTE Advanced) network. Whilst the call setup and call data flow is preferably conducted via the PLMN, the communications relating to the separate data communications session, e.g. communications with the server system 100, may be conducted via a different radio access network (RAN), such as a wireless local area network (WLAN) based on the IEEE 802.11 standards.

In the above-described embodiments, the server system 100 is described as a single computing device located in a single network location. However, it should be understood that the server may consist of a distributed set of computing devices or applications, either co-located in a single network location, or dispersed in different network locations.

Various measures (for example, a method, server system, telecommunications network, computer software and a computer program product) of establishing a communications session for communication of data with respect to at least two user devices in a data communications network are provided. Call party details of a telephone call are received. The telephone call involves at least a first telephony user device and a second telephony user device. The call party details include a first identity associated with the first telephony user device and a second identity associated with the second telephony user device. A separate communications session is established, on the basis of the first and second identities received in the call party details. The separate communications session is separate from the telephone call and is for the communication of data to and/or from the at least two user devices. An identifier is received from one of the at least two user devices. The identifier identifies a software component to be used in the separate communications session. The download of the software component to another of the at least two user devices is enabled, in response to the receipt of the software component identifier.

In some embodiments, a capability check is conducted to determine whether the another of the at least two user devices is initially enabled with the software component. The enabling is conducted if the capability check indicates that the another of the at least two user devices is not initially enabled with the software component.

In some embodiments, capability data indicating capabilities of a plurality of user devices is stored in a data store accessible by a server. The capability check is conducted at the server.

In some embodiments, the capability check comprises transmitting a capability query to the another of the at least two user devices, and receiving a response indicating whether the another of the at least two user devices is initially enabled with the software component.

In some embodiments, the separate communications session is established using a session establishment software application or operating system function on the another of the at least two user devices, and the software component is a software application which interoperates with the session establishment software application or operating system function.

In some embodiments, establishing the session comprises receiving a client-server connection request from, and establishing a client-server connection with, the another of the at least two user devices, and transmitting the software application via the client-server connection.

In some embodiments, the client-server connection request is transmitted in response to the telephone call being established.

In some embodiments, the client-server connection request is transmitted in response to a notification received during the telephone call, after the telephone call is established.

In some embodiments, at least one of the first and second identities comprises a telephone dialling number.

Measures (for example a telephony user device, computer software for a telephony user device, a computer product) capable of establishing a communications session for communication of data with respect to at least one other user device in a data communications network are provided. A telephony user device is arranged to transmit call party details of a telephone call. The telephone call involves at least the telephony user device, the telephony user device being a first telephony user device, and a second telephony user device. The call party details include a first identity associated with the first telephony user device and a second identity associated with the second telephony user device. At least one of the first and second identities comprises a telephone dialling number. The telephone user device is also arranged to establish, on the basis of the first and second identities received in the call party details, a separate communications session. The separate communications session is separate from the telephone call and is for the communication of data to and/or from the at least one other user device. The telephone user device is also arranged to enable the download of a software component to be used in the separate communications session to the at least one other user device. The enabling comprises transmitting an identifier identifying a software component to be used in the separate communications session.

Various measures (for example a method, server system, telecommunications network, computer software and computer program product) of establishing a communications session for communication of data with respect to at least two user devices in a data communications network are provided. Call party details of a telephone call are received. The telephone call involves at least a first telephony user device and a second telephony user device. The call party details include a first identity associated with the first telephony user device and a second identity associated with the second telephony user device. At least one of the first and second identities comprises a telephone dialling number. A separate communications session is established, on the basis of the first and second identities received in the call party details. The separate communications session is separate from the telephone call and is for the communication of data to and/or from the at least two user devices. Establishing the separate communications session comprises: in response to receiving the call party details, identifying at least one of the at least two user devices which is an initially non-enabled user device that does not have a capability associated with participating in the session; and enabling the download of a software application to the initially non-enabled user device, in order to provide the initially non-enabled user device with the capability associated with participating in the session.

In some embodiments, enabling comprises transmitting a network address from which the software application can be downloaded.

In some embodiments, the network address is in the form of a Uniform Resource Locator (URL).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of establishing a communications session for communication of data with respect to at least two user devices in a data communications network, the method comprising:
receiving call party details of a telephone call, the telephone call involving at least a first telephony user device and a second telephony user device, said call party details including a first identity associated with said first telephony user device and a second identity associated with said second telephony user device;
establishing, on the basis of said first and second identities received in said call party details, a separate communications session, separate from said telephone call, for the communication of data to and/or from said at least two user devices;
receiving, from one of said at least two user devices, an identifier identifying a software component to be used in said separate communications session; and
enabling the download of said software component to another of said at least two user devices, in response to the receipt of said software component identifier.

2. A method according to claim 1, wherein said method comprises conducting a capability check to determine whether said another of said at least two user devices is initially enabled with said software component, and conducting said enabling if the capability check indicates that said another of said at least two user devices is not initially enabled with said software component.

3. A method according to claim 2, wherein said method comprises storing capability data indicating capabilities of a plurality of user devices in a data store accessible by a server, and conducting said capability check at said server.

4. A method according to claim 2, wherein said capability check comprises transmitting a capability query to said another of said at least two user devices, and receiving a response indicating whether said another of said at least two user devices is initially enabled with said software component.

5. A method according to claim 1, wherein said separate communications session is established using a session establishment software application or operating system function on said another of said at least two user devices, and wherein said software component is a software application which interoperates with said session establishment software application or operating system function.

6. A method according to claim 1, wherein establishing said session comprises receiving a client-server connection request from, and establishing a client-server connection with, said another of said at least two user devices, and transmitting said software application via said client-server connection.

7. A method according to claim 6, wherein said client-server connection request is transmitted in response to said telephone call being established.

8. A method according to claim 6, wherein said client-server connection request is transmitted in response to a notification received during said telephone call, after the telephone call is established.

9. A method according to claim 1, wherein at least one of said first and second identities comprises a telephone dialling number.

10. A server system arranged to perform a method of establishing a communications session for communication of data with respect to at least two user devices in a data communications network, the method comprising:
receiving call party details of a telephone call, the telephone call involving at least a first telephony user device and a second telephony user device, said call party details including a first identity associated with said first telephony user device and a second identity associated with said second telephony user device;
establishing, on the basis of said first and second identities received in said call party details, a separate communications session, separate from said telephone call, for the communication of data to and/or from said at least two user devices;

receiving, from one of said at least two user devices, an identifier identifying a software component to be used in said separate communications session; and enabling the download of said software component to another of said at least two user devices, in response to the receipt of said software component identifier.

11. A computer program product comprising a non-transitory computer-readable storage medium having computer readable instructions stored thereon, the computer readable instructions being executable by a computerized device to cause the computerized device to perform a method of establishing a communications session for communication of data with respect to at least two user devices in a data communications network, the method comprising:

receiving call party details of a telephone call, the telephone call involving at least a first telephony user device and a second telephony user device, said call party details including a first identity associated with said first telephony user device and a second identity associated with said second telephony user device;

establishing, on the basis of said first and second identities received in said call party details, a separate communications session, separate from said telephone call, for the communication of data to and/or from said at least two user devices;

receiving, from one of said at least two user devices, an identifier identifying a software component to be used in said separate communications session; and enabling the download of said software component to another of said at least two user devices, in response to the receipt of said software component identifier.

12. A telephony user device capable of establishing a communications session for communication of data with respect to at least one other user device in a data communications network, the telephony user device being arranged to:

transmit call party details of a telephone call, the telephone call involving at least said telephony user device, said telephony user device being a first telephony user device, and a second telephony user device, said call party details including a first identity associated with said first telephony user device and a second identity associated with said second telephony user device, at least one of said first and second identities comprising a telephone dialling number;

establishing, on the basis of said first and second identities received in said call party details, a separate communications session, separate from said telephone call, for the communication of data to and/or from said at least one other user device; and enabling the download of a software component to be used in said separate communications session to said at least one other user device, said enabling comprising transmitting an identifier identifying a software component to be used in said separate communications session.

* * * * *